United States Patent [19]

Tsujimoto et al.

[11] Patent Number: 4,470,677
[45] Date of Patent: Sep. 11, 1984

[54] DATA INSERTABLE CAMERA

[75] Inventors: Shinichi Tsujimoto; Yoshitaka Watanabe, both of Tokyo, Japan

[73] Assignee: Canon Kabushiki Kaisha, Tokyo, Japan

[21] Appl. No.: 391,375

[22] Filed: Jun. 23, 1982

[30] Foreign Application Priority Data

Jun. 30, 1981 [JP] Japan .................................. 56-101826
Jun. 30, 1981 [JP] Japan .................................. 56-101827

[51] Int. Cl.³ .......................... G03B 1/18; G03B 17/24
[52] U.S. Cl. .................................. 354/106; 354/173.1
[58] Field of Search .............................. 354/105–109, 354/173, 173.1, 173.11; 352/55, 90; 355/39, 40

[56] References Cited

U.S. PATENT DOCUMENTS 4,086,603 4/1978 Kozuki et al. .................. 354/173 X

FOREIGN PATENT DOCUMENTS 2902674 7/1979 Fed. Rep. of Germany ...... 354/106
132322 10/1981 Japan .................................. 354/106

Primary Examiner—William B. Perkey
Attorney, Agent, or Firm—Toren, McGeady and Stanger

[57] ABSTRACT

A camera having a data inserting device and an electric motor drive device is arranged to insert data onto each film frame, but to permit insertion of data only onto a first frame of film when a camera release button is depressed to produce a continuous photographic operation at high speed.

4 Claims, 7 Drawing Figures

DATA INSERTABLE CAMERA

BACKGROUND OF THE INVENTION

Field of the Invention

This invention relates to a photographic camera and more particularly to a camera of the type having an electric motor drive device and a data inserting device.

Photographic cameras of the type incorporating a data inserting device therein to permit insertion of photographic data such as the date of photographing, an aperture value, a shutter speed, etc. into the frames of film together with the image of an object to be photographed in association with a shutter release action are known. It is also known to have such a data inserting device disposed on the inside of a back cover arranged to be attachable to and detachable from the camera.

Conventional cameras further include a type incorporating a motor to have shutter charging and film winding devices driven by the force of the motor. Further, a motor drive device which is attachable to and detachable from a camera and is arranged to drive the film winding device of a camera is also known. In the conventional data inserting device which as been used for such cameras, an inserting light source such as a lamp, a light emitting diode or the like is arranged to be lit in response to a signal representing the start of a shutter release, completion of the travel of a leading curtain of the shutter, completion of a shutter release or the like. The inserting light source lighting time is preset within a control circuit to give a suitable exposure light to the film in consideration of the sensitivity of the film. Generally, the length of the lighting time is required to be considerably longer than the length of time required from the beginning of a shutter release action and the completion of the shutter release. Meanwhile, where a continuous photographic operation is to be carried out with an electric motor drive device or the like, a motor disposed within the motor drive device is arranged to be started by a shutter release completion signal for driving a film winding system. Accordingly, in a camera provided with both a data insertion device and an electric motor drive device, when data insertion is effected simultaneously with the continuous photographic operation, the film winding action might begin before completion of the lighting of the data inserting light source. In other words, the film might travel before completion of data insertion and this would result in a blurred data on the picture. Particularly, where a film of low sensitivity is used for the photographic operation and a relatively longer lighting time is required for data insertion, the probability of such an undesirable result increases. In such a case, therefore, it becomes virtually impossible to carry out a continuous photographic operation with an electric motor drive device.

To eliminate this shortcoming in the conventional data inserting arrangement, a proposal has been made for a camera which is arranged such that a data inserting signal is supplied to a data inserting device at the same time as a winding signal is supplied to an electric motor drive device upon completion of a shutter release action of the camera; the, a winding inhibition signal is supplied to the electric motor drive device during a data inserting action of the data inserting device; and, after the winding signal of the camera is received by the electric motor drive device, a winding action is allowed to begin when the electric motor drive devices ceases to receive the winding inhibition signal from the data inserting device any longer.

In this case, however, the film winding action is not performed until completion of lighting of the data inserting light source. Therefore, a continuous photographic operation at a very high speed becomes impossible when the data inserting device is used.

A system wherein a data inserting device and an electric motor drive device are to be used by mounting and dismounting them on and from a camera body necessitates a switch for producing an inserting signal in addition to a winding switch for producing a winding signal within the camera. In such a case, the number of terminals between the camera body and the electric motor drive device increases. This in turn results in increased probability of an erroneous action due to dirt or water drops. Such a system further necessitates provision of a circuit within the electric motor drive device for receiving the winding signal from the camera body and the winding inhibition signal from the data inserting device. This renders the conventional electric motor drive device unusable.

SUMMARY OF THE INVENTION

It is an object of the present invention to provide a data inserting device for a camera which is arranged to solve the above stated problems of the prior art and to enable a continuous photographic operation to be performed at a very high speed by effecting data insertion solely into a first frame of film so that data can recorded on the film to the minimum necessary extent.

It is another object of the invention to provide a data inserting device for a camera which is capable of effectively preventing a winding action from being started during a data inserting process without necessitating provision of an additional arrangement for producing an insertion signal within the camera and provision of an additional circuit and a terminal within an electrical motor drive device.

The device according to the invention attains these objects through such an arrangement that: A data inserting light source of the device is arranged to be lit for a predetermined length of time in response to receipt of a winding signal from the camera: and the device is provided with a light command circuit which is arranged to produce a lighted state informing signal while the light source remains alight and a winding command circuit which is arranged to receive a winding signal from the camera and to produce a winding command signal in response thereto when it ceases to receive the lighted stated informing signal any longer.

These and further objects, features and advantages of the invention will become apparent from the following detailed description of preferred embodiment thereof taken in connection with the accompanying drawings.

DESCRIPTION OF THE PREFERRED EMBODIMENTS

Figure 1:
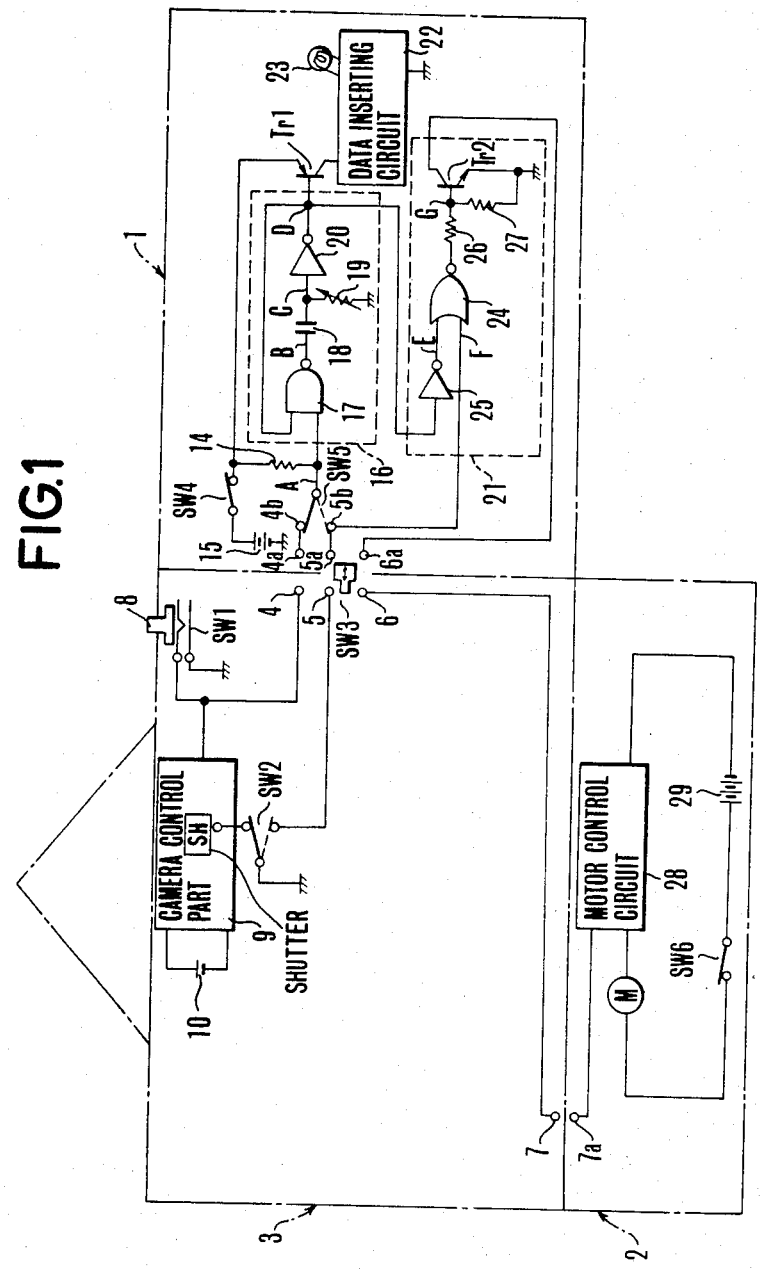
FIG. 1 is a circuit diagram showing a data inserting device attached to a camera together with an electric motor drive device as an embodiment of the invention.

As shown in the circuit of FIG. 1, a data inserting device 1 which embodies features of the present invention and an electric motor drive device 2 are mounted on a camera 3. Connection terminals 4, 5, 6 and 7 are disposed on the camera. Connection terminals 4a, 5a and 6a are disposed on the data inserting device 1 while a connection terminal 7a is disposed on the electric motor drive device 2. The camera includes a release button 8 and a control part 9 including a known shutter SH.

The electric motor drive device 2 is provided with a known coupling means which is arranged to be coupled with a winding device provided within the camera. The winding device is arranged to be driven by the rotation of the motor of the electric motor drive device to wind the film and cock the shutter. The terminals 4, 5 and 6 disposed in the camera are arranged to be automatically connected to the terminals 4a, 5a and 6a of the data inserting device 1. The terminal 7 which is also disposed on the camera is arranged to be automatically connected to the terminals 4a, 5a and 6a of the data inserting device 1. The terminal 7 which is also disposed on the camera is arranged to be automatically connected to the terminal 7a disposed on the electric motor drive device 2. The release button 8 on the camera 3 is arranged to have a release switch SW1 turned on by a depressing operation performed thereon. The camera is provided with a control part 9 which is arranged to cause shutter release to begin with the release switch SW1 is turned on. The control part 9 is further arranged to keep a winding switch SW2 turned on, as shown by a dotted line, during the period from completion of shutter release to completion of film winding. The control part of the camera is provided with a power source 10. When the data inserting device 1 is not attached to the camera 3 or while a main switch SW4 of the data inserting device 1 is off, the terminals 5 and 6 are short-circuited by a short-circuit switch SW3.

Figure 2A:
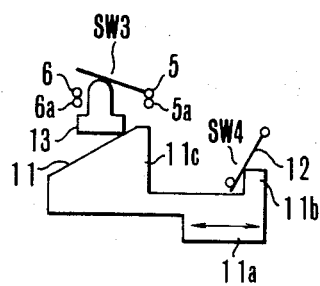
FIGS. 2(A) and 2(B) are schematic views showing the structural arrangement of a main switch relative to the embodiment of the invention.
Figure 2B:
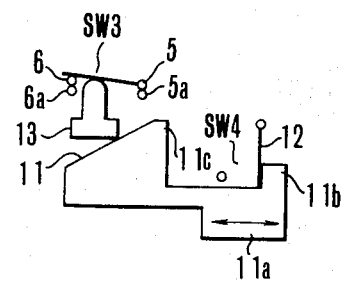

The structural arrangement of the main switch SW4 of the data inserting device 1 is shown in FIG. 2. FIG. 2(A) shows the main switch SW4 as in an on state while FIG. 2(B) show it as in an off state. The main switch SW4 is provided with a switch member 11. The switch member 11 has an operating part 11a which protrudes on the outside of the data inserting device 1. The switch member 11 is further provided with a pushing part 11b. When the operating part 11a is moved to the left, the pushing part 11b pushes a contactor 12 of the main switch SW4 to the left to turn on the switch SW4. The leftward movement of the switch member 11 causes a slanting part 11c of the switch member 11 to lift a follower member 13. The follower member then serves to turn off the short circuit switch SW3. The follower member 13 is arranged to be continuously pushed downward by a spring which is not shown and is thus kept abutting on the slanting part 11c. The main switch SW4 turns off when the switch member 11 is moved to the right. Meanwhile, the short-circuit switch SW 3 turns on as the descent of the follower member 13 takes place. Further, when the data inserting device 1 is not mounted on the camera 3, the follower member 13 disengages from the short-circuit switch SW3 to cause it to turn on.

Again in FIG. 1, the data inserting device 1 is provided with an selection switch SW5. The switch SW5 has a contact 4b arranged to be used for a high speed continuous photographic operation and another contact 5b for an ordinary continuous photographic operation. The selection switch SW5 is connected to a power source 15 through a resistor 14 and the main switch SW4 and is also connected to a lighting command circuit 16, which is composed of an NAND gate 17, a capacitor 18, a variable resistor 19 and an inverter 20. The output of the lighting command circuit 16 is arranged to be applied to the base of a transistor Tr1 and a winding command circuit 21. The transistor Tr1 is arranged to control a data inserting circuit 22 and a data inserting light source 23. A NOR gate 24 of the winding command circuit 21 is arranged to receive an input through a terminal 5a and the output terminal of an inverter 25 which inverts the output of the lighting command circuit 16. The output of the NOR gate 24 is arranged to be applied to the base of a transistor Tr2 through a resistor 26. A reference numeral 27 designates a resistor. The output of the winding command circuit 21 is supplied to a motor control circuit 28 of the electric motor drive device 2 through the terminals 6a, 6, 7 and 7a. A reference symbol M designates a motor; SW6 designates a power source switch; and a reference numeral 29 designates a power source.

Figure 3:
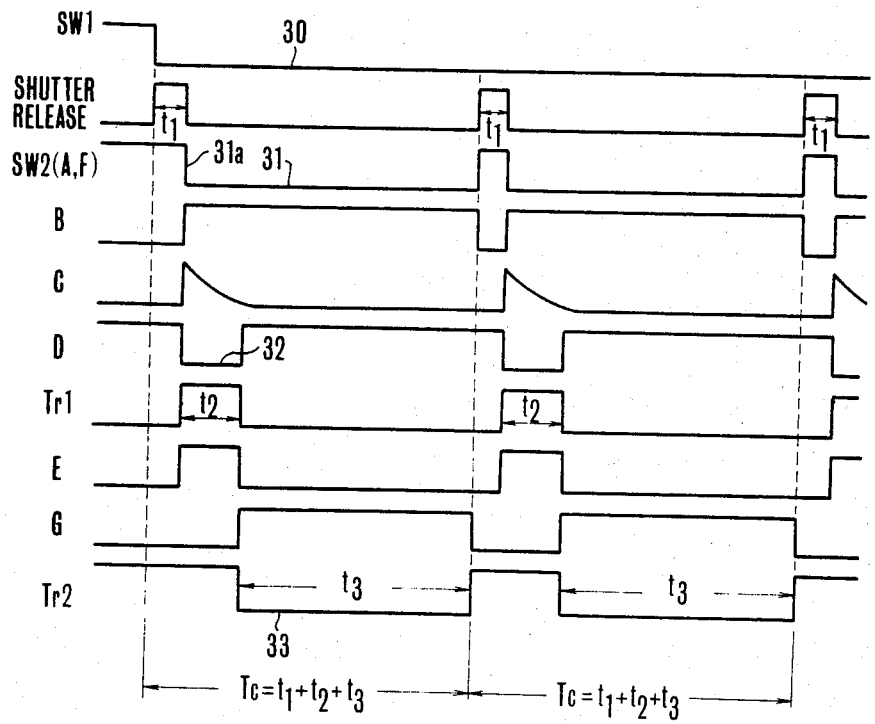
FIGS. 3 and 4 are time charts showing the operation of the embodiment of the invention.

Referring now to the time chart of FIG. 3, the operation which takes place under the ordinary continuous photographic condition is described below:

In this case, the selection switch SW5 is turned to the contact 5b. Since the main switch SW4 is, of course, the short-circuit switch SW3 is off. Points A through F of FIG. 3 respectively, represent each part shown in FIG. 1.

When the release switch SW1 is turned on, i.e. the top contact pressed against the ground contact with the release button depressed, a release-button-on signal 30 of a low level is supplied to the camera control part 9. Then, a shutter release is effected (at time $t_1$). Upon completion of the shutter release, the winding switch SW2 is turned on. A low level winding signal 31 is transmitted to the point A through the terminals 5 and 5a and the selection switch SW5. The leading edge 31a of the winding signal 31 then causes the output (the potential at the point B) of the NAND gate 17 to change from a low level to a high level. This level displacement is then differentiated through a differentiation circuit consisting of a capacitor 18 and a variable resistor 19 is converted into a lighting command signal 32 by the inverter 20. The lighting command signal 32 turns on the transistor Tr1 to actuate the data inserting circuit 22. With the data inserting circuit 22 thus operated, the inserting light source 23 is lit up. A data inserting time $t_2$ which has been set beforehand by adjusting the resistance value of the variable resistor 19 with the sensitivity of the film in use is taken into consideration.

The lighting command signal 32 is transferred as a lighted state informing signal to the NOR gate 24 through the inverter 25. Meanwhile, since the other input terminal of the NOR gate 24 is in receipt of the low level winding signal 31 from the windinng switch SW2, the output of the NOR gate 24 is kept at a low level when there is a lighted state informing signal. With the output of the NOR gate thus kept at a low level, the transistor Tr2 is off and the motor M of the electric motor drive device 2 remains stationary. When the lighted state informing signal disappears, the level of the potential at a point E becomes low. The level of the output of the NOR gate 24 then becomes high to turn on the transistor Tr2. With the transistor Tr2 turned on, a winding signal of a low level is transferred to the electric motor drive device 2. This causes the motor M to rotate to wind the film. Upon completion of winding through a winding time $t_3$, the winding switch SW2 turns off. Since the release button 8 is still kept depressed at this time, the next shutter release takes place. With the winding switch SW2 turned off, the output of the NAND gate 17 changes to a low level. The level of the output of the NOR gate 24 becomes low to bring the winding command signal 33 to an end. Consequently, when the next shutter release is completed, the same actions as those described above are repeated.

The length of time Tc ($=t_1+t_2+t_3$) required for one cycle from the beginning of the shutter release through the end of winding thus becomes the sum of the time $t_1$, time $t_2$ and time $t_3$. The winding action is never performed before completion of data insertion. This obviates the fear of blurred data insertion into pictures and data can be inserted into each frame of the film without fail.

Figure 4:
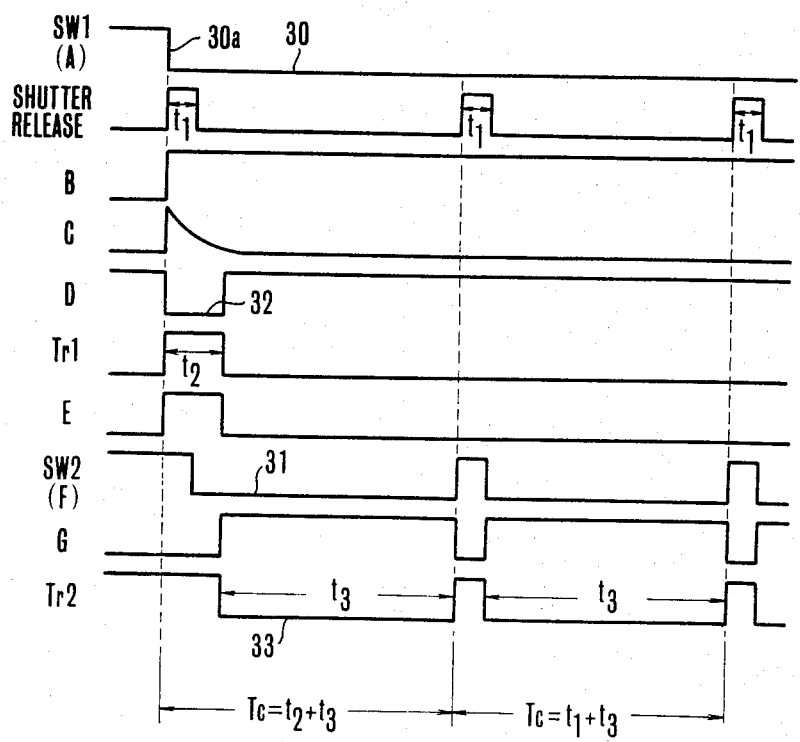

The operation of the embodiment in the case of high speed continuous photography is described below with reference to the time chart of FIG. 4.

The selection switch SW5 in this case is turned to the contact 4b. When the release switch SW1 turns on with the release button 8 depressed, the release-button-on signal 30 of a low level is supplied to the camera control part 9 to have shutter release effected at the time $t_1$. When the release-button-on signal 30 is supplied to the lighting command circuit 16, the leading edge 30a of the signal 30 produces the lighting command signal 32 whose pulse width is equal to the data inserting time $t_2$ in the same manner as described in the foregoing. With the signal 32 thus produced, the transistor Tr1 turns on to cause the inserting light source 23 to light up and the data insertion is effected on the film. The insertion begins simultaneously with the shutter release. Since the lighting command signal 32 is arranged to be produced by the leading edge 30a of the release-button-on signal 30, the signal 32 is produced solely for the first frame of the film and is not produced for the subsequent frames of the film. Accordingly, data insetion is effected only into the first frame. After that, shutter release and film is wound or fed alternately and continuous photography is carried on without data insertion.

When the lighting command signal 32 is supplied as a lighting state informing signal to the NOR gate 24 through the inverter 25, the output of the NOR gate 24 is at a low level and the transistor Tr2 is off irrespective of the level of the input from the winding switch SW2 to ensure that the electric motor drive device 2 remains inoperative. The winding switch SW2 turns off after completion of shutter release. With the switch SW2 turned off, the low winding signal 31 is supplied to the NOR gate 24. After that, when the lighted state informing signal disappears upon completion of data insertion, the level of the output of the NOR gate 24 becomes high to turn on the transistor Tr2. With the transistor Tr2 turned on, a winding command signal of a low level is supplied to the electric motor drive device 2 and winding begins. The winding is that represented by the symbol $t_3$.

In this case, the length of the time Tc required for one cycle from the beginning of the shutter release through the end of winding is the sum of the insertion time $t_2$ and the winding time $t_3$ solely for the first frame and, after that, becomes the sum of the shutter time $t_1$ and the winding time $t_3$. Since the shutter time $t_1$ is normally shorter than the inserting time $t_2$, the time Tc required for one cycle for each of the frames after the first one becomes much shorter than the time Tc required for the first frame. Further, as compared with the time Tc required when the selective switch SW5 is shifted to the contact 5b, i.e. when the time Tc is $t_1+t_2+t_3$, the required length of time Tc in this case becomes much shorter and thus permits continuous photography at a high speed. Besides, since the winding action is inhibited until completion of data insertion into the first frame, the data insertion can be accomplished without fail and never results in blurred data insertion on the picture.

When the data inserting device 1 is not attached to the camera 3 and only the electric motor drive device is attached to the camera, the winding signal 31 from the winding switch SW2 is directly transmitted to the electric motor drive device through the sequence of the terminal 5, the short-circuit switch SW3, the terminal 6, the terminal 7 and the terminal 7a, so that the electric motor drive device winds film in the ordinary manner.

In accordance with the invention, the lighting command circuit 16 is not limited to the type using the differentiation circuit as shown in FIG. 1. Another example of an arrangement of the lighting command circuit 16 is that shown in FIG. 5. This lighting command circuit 16 comprises an oscillation circuit 34, a first counter 35 of asynchronous $2^n$ binary notation, a second counter 36, a flip-flop composed of NOR gates 37 and 38, a NOR gate 40, an AND gate 41, and inverter 42 and an inserting time setting switch SW7.

Figure 6:
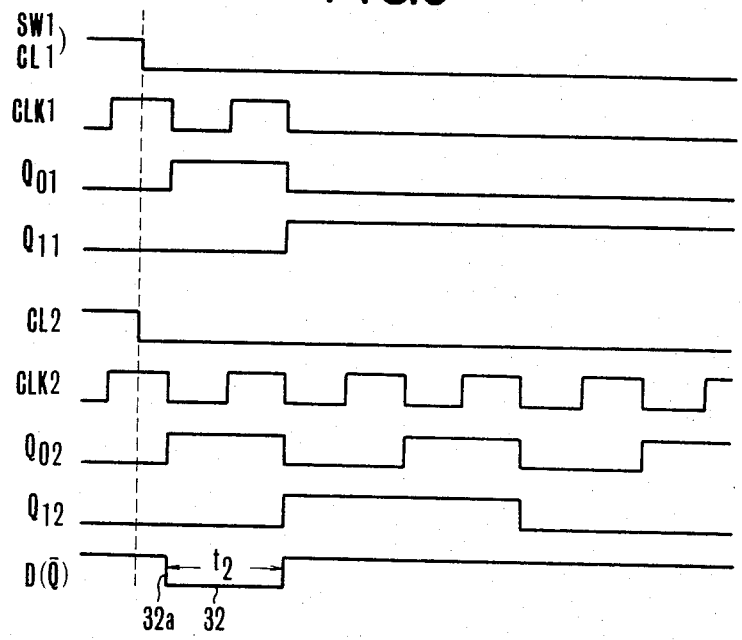
FIG. 6 is a time chart showing the operation of the lighting command circuit shown in FIG. 5.

Referring now to the time chart of FIG. 6, this embodiment operates in the following manner: With the release switch SW1 turned on, the release-button-on signal 30 which is low is supplied to the clear terminal CL2 of the second counter 36 through the clear terminal CL1 of the first counter 35 and the AND gate 41. Then, the first counter 35 and the second counter 36 count clock pulses coming to clock terminals CLK1 and CLK2 from the oscillation circuit 34. The output terminal $Q_{11}$ of the first counter 35 is connected to one of the input terminals of the NOR gate 40. Therefore, when the level of the output from the output terminal $Q_{11}$ becomes high, the NOR gate is closed and the first counter 35 stops counting with only one pulse produced from the output terminal $Q_{01}$. With the level of the output of the output terminal $Q_{01}$ becoming high, the flip-flop 39 is set. Then, a lighting command signal 32 of a low level is produced from the reset output terminal $\bar{Q}$ of the flip-flop 39. This causes the transistor Tr1 to turn on and the inserting light source 23 lights up. Meanwhile, with the clock pulses counted by the second counter 36, when the level of the output of the output terminal $Q_{12}$ of the second counter 36 becomes high, the flip-flop 39 is reset to and the lighting command signal 32. The lighting command signal 32 is transmitted as a lighted state informing signal to the winding command circuit 21 shown in FIG. 1 to inhibit operation of the electric motor drive device 2.

Figure 5:
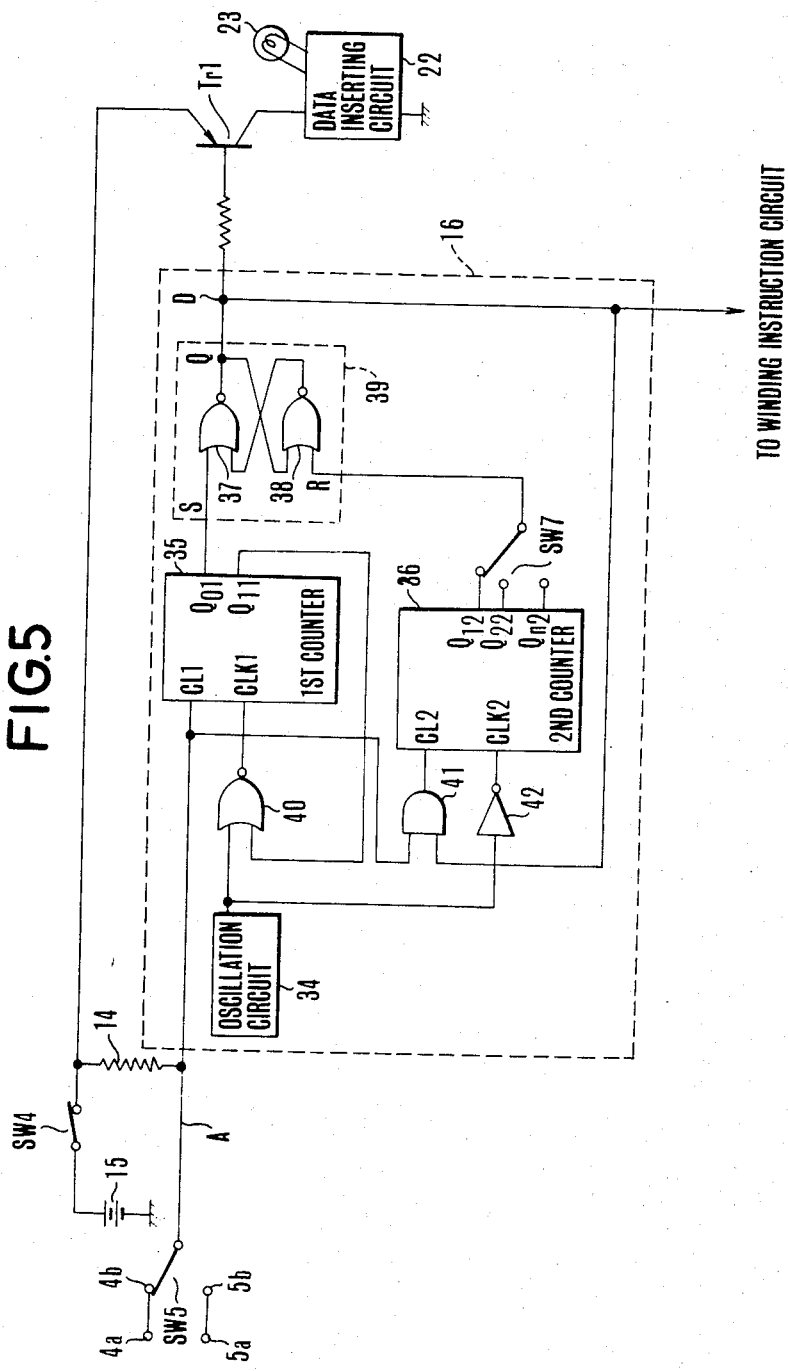
FIG. 5 is a circuit diagram showing a lighting command circuit as another embodiment of the invention.

The pulse width of the lighting command signal 32, i.e. the inserting time $t_2$ is selected by the inserting time setting switch SW7. As shown in FIG. 5, the output terminal $Q_{12}$ is selected. Therefore, the inserting time $t_2$, becomes equal to one clock pulse. However, selection of one of the other terminals $Q_{22}$—$Q_{n2}$ makes the inserting time $t_2$ equal to a number of pulses included in the numbers of clock pulses $3-(2^n-1)$.

The lighting command signal 32 is produced by the leading edge 30a of the release-button-on signal 30. However, since the leading edge 32a of the lighting command signal 32 is determined by the phase of the first of the clock pulses supplied to the first counter 35, the phase of the leading edge 32a is somewhat delayed from that of the leading edge 30a of the signal 30.

When the release switch SW1 is turned off by releasing depression of the release button 8, the clear terminals CL1 and CL2 of the first and second counters 35 and 36 receive a high level signal. The levels of the outputs of the output terminals $Q_{01}$, $Q_{11}$, $Q_{12}-Q_{n2}$ all become low and the lighting command circuit 16 returns to its initial state.

The operation described above takes place with the selection switch SW5 set on the contact 4b. When the selection switch SW5 is shifted to the contact 5b, turning on the winding switch SW2 causes a winding signal 31 of a low level to be supplied to the clear terminals CL1 and CL2 of the first and second counters 35 and 36. The operation after that takes place in exactly the same manner as the operation described in the foregoing.

In the embodiments shown in FIG. 1 and FIG. 5, selection between a high speed continuous photographic operation and an ordinary continuous photographic operation can be accomplished by simply operating the selection switch SW5. The camera according to the invention thus can be used for a wide range of purposes including the high speed continuous photography required for spots such as skiing and photographing accurate data at predetermined intervals fo scientific research.

While in the embodiments shown in FIGS. 1 and 5, the lighting command signal 32 is used as a lighted state informing signal, the lighted state information signal may be obtained either by turning the transistor Tr1 on or by separately producing it in response to lighting of the inserting light source 23. In FIG. 1, the circuit composed of the inverter 25, a NOR gate 24, resistors 26 and 27, the transistors Tr2 is disposed within the data inserting device. However, this circuit may be disposed within the electric motor drive device 2.

While, the electric motor drive device 2 is used as film winding drive device in the embodiment shown in FIG. 1, this may be replaced with a drive device using a spring.

As described above, in accordance with the invention, the inserting light source is arranged to be lighted for a given length of time after it is lit up by the leading edge of the release-button-on signal which is produced by a depressing operation on the release button. In carrying out a continuous photographic operation by continuously depressing the release button, therefore, data insertion is effected only onto the first frame of film. Since the data insertion is not performed for the second and subsequent frames, the continuous photographic operation can be carried out without fail at a very high speed with minimum necessary data recorded. Since high speed continuous photography is completed in a short period of time, there is little probability of any change in the data to be recorded. Therefore, any required recorded can be sufficiently covered by the record inserted in the first frame of film. In the meantime, the consumption of the power source battery can be held to a minimum by the omission of data insertion after the first frame. The arrangement to cause the lighting command circuit to produce the lighted state informing signal required for controlling the film winding drive device ensures that film winding can be prevented during the process of data insertion.

While the invention has been described in the foregoing through the embodiments of the type having a data inserting device and an electric motor drive device arranged to be attachable to and detachable from a camera body, it is to be understood that the invention is not limited to such applications but is, of course, effectively applicable also to a camera of the type having an electric motor drive device incorporated therein or of the type having a data inserting device undetachably attached thereto.

What is claimed is:

1. A data insertable camera comprising:
   a shutter;
   a winding device for film winding and shutter charging;
   a shutter release button for releasing said shutter;
   a winding switch for turning on upon completion of shutter release to produce a winding signal and for turning off upon completion of winding;
   a data inserting device for inserting photographic data onto frames of film, said data inserting device including a light source for insertion of the data;
   a motor drive device for driving said winding device, said motor drive device including a motor for driving the winding device; and
   changeover means for changing between a data-printing state where the winding signal from said winding switch is transferred to the data inserting device and non-data-printing state where the winding signal is transferred directly to said motor drive device;
   said data inserting device further including a lighting command circuit for producing a lighting command signal for causing said light source to be lit for a predetermined length of time upon receipt of the winding signal from said winding switch; and a winding command circuit for receiving the lighting command signal and the winding signal, said winding command circuit being arranged to produce a winding command signal when the winding signal is received after disappearance of the lighting command signal, and
   said motor drive device being arranged for starting the drive of said winding device upon receipt of the winding command signal in the data-printing state, starting the drive of the winding device upon receipt of the winding signal from said winding switch in the non-data-printing state, and stopping the drive in the absence of the winding signal and winding command signal.

2. A data insertable camera comprising:
   a shutter;
   a film winding device;
   a release button for releasing said shutter, said button being arranged such that film winding and shutter charging actions can be alternately repeated by continuously depressing said button;
   release signal producing means arranged to produce a release signal in response to a depressing operation on said release button;
   a winding switch arranged to produce a winding signal upon completion of said shutter release;

a data inserting device for inserting photographic data onto frames of film, said data inserting device including a light source for insertion of data; and a motor driving device for driving said film winding device, said motor drive device including a motor for driving the film winding device, said data inserting device further including a lighting command circuit for receiving the release signal from said release signal producing means and is arranged to produce a lighting command signal after receiving the leading edge of the release signal so as to illuminate the light source for a predetermined length of time; and a winding command circuit for receiving the lighting command signal and the winding signal from the winding switch and is arranged to produce a winding command signal only when there is no lighting command signal according to the winding signal so as to start the motor data so that data are inserted only on a first frame of the film while the release signal is held on and so as to perform continuous photography without inserting data on other frames.

3. A camera according to claim 2 further including a selection switch which selectively connects said lighting command circuit to said release switch or to said winding switch.

4. A camera according to any of claims 1 to 3, wherein said data inserting device is attachable to and detachable from the camera.

* * * * *